US012199394B2

(12) United States Patent
Korsmeier et al.

(10) Patent No.: US 12,199,394 B2
(45) Date of Patent: Jan. 14, 2025

(54) MAGAZINE FOR PROCESSING WIRE END FERRULES AND HAND TOOL FOR PRESSING WIRE END FERRULES

(71) Applicant: Phoenix Contact GmbH & Co. KG, Blomberg (DE)

(72) Inventors: Jonas Korsmeier, Lemgo (DE); Kilian Klages, Detmold (DE); Jens Frischemeier, Köterberg-Niese (DE); Tobias Oldenburger, Steinheim (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 361 days.

(21) Appl. No.: 17/621,720

(22) PCT Filed: Jun. 29, 2020

(86) PCT No.: PCT/EP2020/068288

§ 371 (c)(1),
(2) Date: Jan. 3, 2022

(87) PCT Pub. No.: WO2021/001321

PCT Pub. Date: Jan. 7, 2021

(65) Prior Publication Data

US 2022/0247140 A1 Aug. 4, 2022

(30) Foreign Application Priority Data

Jul. 2, 2019 (DE) ......................... 102019117856.8

(51) Int. Cl.
*H01R 43/045* (2006.01)
*H01R 43/042* (2006.01)

(52) U.S. Cl.
CPC ....... *H01R 43/045* (2013.01); *H01R 43/0421* (2013.01)

(58) Field of Classification Search
CPC .. H01R 43/045; H01R 43/0421; B25B 27/146
See application file for complete search history.

(56) References Cited

U.S. PATENT DOCUMENTS 3,911,712 A 10/1975 Wustinger et al.
4,449,283 A * 5/1984 Berecz .................... B23P 19/00 29/240.5

(Continued)

FOREIGN PATENT DOCUMENTS

DE 4241224 C1 1/1994
DE 4322856 C1 6/1994

(Continued)

OTHER PUBLICATIONS

Ogihara et al., "Mechanical Analysis of the Crimping Connection," Electrical Contacts—2006. Proceedings of the 52nd IEEE Holm Conference on Electrical Contacts, Montreal, QC, Canada, 2006, pp. 89-94. (Year: 2006).

*Primary Examiner* — Teresa M Ekiert
(74) *Attorney, Agent, or Firm* — Calderon Safran & Wright P.C.; David S. Safran

(57) ABSTRACT

A magazine (1) for processing wire terminations (2), which are connected to one another via connecting bridges (3) to form a wire termination strip (4), wherein the magazine (1) has a housing (5). The housing (5) has a magazine level in which the wire terminations (2) can be separated from the wire termination strip (4) by a cutting device (6) provided in the magazine level. A feed mechanism (7) is provided in the magazine level, by which mechanism the wire termination strip (4) can be transported in the magazine level, so that the separated wire terminations (2) can be conveyed into a depression level for processing, the magazine level and the depression level being different from one another.

20 Claims, 7 Drawing Sheets

(56) References Cited

U.S. PATENT DOCUMENTS

| | | | | |
|---|---|---|---|---|
| 5,347,705 | A * | 9/1994 | Schmode | H01R 43/045 29/566.4 |
| 5,400,941 | A | 3/1995 | Schmode et al. | |
| 5,500,998 | A | 3/1996 | Schmode et al. | |
| 6,315,118 | B1 | 11/2001 | Sauce | |
| 8,234,904 | B2 | 8/2012 | Kerner et al. | |
| 11,121,516 | B2 | 9/2021 | Fröhlich et al. | |
| 11,398,709 | B2 | 7/2022 | Fröhlich et al. | |
| 2002/0033039 | A1 | 3/2002 | Gautheret et al. | |
| 2022/0140558 | A1 | 5/2022 | Korsmeier et al. | |

FOREIGN PATENT DOCUMENTS

| | | | |
|---|---|---|---|
| EP | 2006962 | A1 | 12/2008 |
| FR | 76343 | E | 10/1961 |
| JP | 2007153525 | A | 6/2007 |
| JP | 2010-9768 | A | 1/2010 |

* cited by examiner

MAGAZINE FOR PROCESSING WIRE END FERRULES AND HAND TOOL FOR PRESSING WIRE END FERRULES

BACKGROUND OF THE INVENTION

Field of the Invention

The invention relates to a magazine for processing wire terminations, which are connected to one another via connecting bridges to form a wire termination strip, wherein the magazine has a housing.

In addition, the invention relates to a hand tool for crimping wire terminations with a stripped conductor end, or with the stranded wires of a conductor, with a handle, with at least two die stocks that can be brought together by actuating the handle and that form a depression, in which the wire termination can be positioned, and are stored with a magazine in the wire termination, wherein the wire terminations can be fed from the magazine to the depression, and wherein the handle can be brought from a first position into a second position.

Description of Related Art

The crimping of wire terminations with a stripped conductor end or with the stranded wires of a conductor is also known as crimping in the state of the art. During crimping, two components are connected to one another by plastic deformation, so that a homogeneous, nearly undetachable connection exists between the conductor and the wire termination. Crimping is applied as an alternative to soldering or welding in the production of electrical connections. Using a manual machine or a crimping tool, the strands of a cable are connected positively to a wire termination. In this case, relatively high forces are to be applied. In most cases, multiple wire terminations are to be crimped in succession with corresponding conductors. In this case, in order to proceed as expeditiously as possible, there are crimping tools with a supply magazine, in which wire terminations are stored. After a wire termination is crimped, the next wire termination can be inserted manually or automatically into the tool.

European Patent EP 2 182 595 A2 and corresponding U.S. Pat. No. 8,234,904 B2 show, for example, a removable magazine for a manually operated crimping tool. The magazine has a cylindrical base element, in which numerous channels distributed over the periphery are made, into which in each case, individual housings that serve to accommodate individual electrical contacts are inserted. The electrical contacts are inserted into the magazine individually.

German Patent DE 42 41 224 C1 discloses a crimping tool with a cylindrical magazine for accommodating a wire termination strip. The magazine is in this case arranged at a distance from the actual crimping station, so that the beginning of the wire termination strip from the magazine is inserted via an opening into the housing of the crimping tool in the area of a transport system. The transport system has, as an essential component, a transport wheel, which has recesses that are distributed uniformly over its periphery and can rotate around an axis. The separation of an individual wire termination from the strip is done in this case during the actual crimping process. In this case, the connecting bridge between the foremost wire termination and the next wire termination is torn off by a movable die stock forcing the foremost wire termination radially outward, i.e., the normal radius of the recesses is exceeded, so that the foremost wire termination is moved radially outward.

In the case of the magazines and manual machines mentioned above, the handling is disadvantageous. It is occasionally cumbersome to insert the individual wire terminations into the magazine. When feeding stranded wires into wire terminations that are connected to one another, it may occur that stranded wires are bent and are not plugged into the wire terminations, since the immobility of the manual machine hinders the insertion of the conductor. As a result, bad crimping connections can occur that occasionally lead to damage in devices in which the conductor is incorporated with the wire terminations.

SUMMARY OF THE INVENTION

The object of this invention is therefore to indicate a magazine for processing wire terminations as well as a hand tool with a corresponding magazine, which ensure an easier handling and an improvement in process safety.

According to a first teaching, the invention relates to a magazine in which the above object is achieved. The magazine according to the invention is initially and essentially characterized in that the housing has a magazine level in which the wire terminations can be separated from the wire termination strip, in that a cutting device is provided in the magazine level by which device the wire terminations can be separated from one another, in that a feed mechanism is provided in the magazine level, by which mechanism the wire termination strip can be transported in the magazine level, in that the separated wire terminations can be conveyed into a depression level for processing, and in that the magazine level and the depression level are different from one another. Since the magazine level and the depression level are different from one another, a wire termination can be separated from the wire termination strip and brought into the mounting position, without the separated wire terminations already being arranged in the depression level. In this way, it is possible that a wire termination is processed in the depression level, for example, is crimped with the stranded wires of a conductor, wherein at the same time, the next wire termination is separated from the wire termination strip and is brought into the mounting position. The crimped wire termination together with a crimped conductor is then removed from the magazine, wherein the next wire termination is already ready in the mounting position. Another conductor can thus be inserted into the magazine directly after the crimped wire termination is removed, so that the wire termination is brought from the mounting position into the depression level and can be crimped.

The insertion of a conductor into the wire termination can be done via a conductor feed opening in the housing. For the simple introduction of a conductor or the stranded wires of a conductor into the wire termination, it can be provided in the case of a configuration of the invention that the conductor feed opening is configured as a funnel, wherein the funnel-shaped conductor feed opening runs conically in the direction toward the wire termination that is to be processed. The conductor can then be inserted in an uncomplicated manner into the relatively large funnel opening and is guided to the wire termination because of the geometry of the conductor feed opening. Mis-insertion of the conductor is thus eliminated.

The housing of the magazine can have any geometry. Preferably, the housing is configured to be cylindrical. It can also have another rotationally symmetrical or unsymmetrical shape, however.

For easy operation of the magazine, it is provided in a first configuration that the separated wire termination can be brought by the cutting device into a mounting position. In the mounting position, a conductor can be inserted into the wire termination and conveyed from there into the depression level. In the depression level, the wire termination is processed. In the meantime, another wire termination can be moved into the mounting position.

In another configuration of the magazine according to the invention, it is provided that the feed mechanism is configured as a spring ratchet arm, which makes it possible for the wire terminations to be fed linearly. A spring ratchet arm can move the wire terminations inside the magazine in a simple way. To this end, it is conceivable that the spring ratchet arm in its lengthwise extension is arranged crosswise to the transport direction of the wire terminations or the wire termination strip, so that it can be deflected in the transport direction. To ensure better entrainment of the wire terminations in the area in which it touches the wire terminations, the spring ratchet arm can be molded to the contour of the wire terminations. Usually, the wire terminations have a circular cross-section, so that it is also conceivable that the spring ratchet arm describes a part of a circular path in the contact area, i.e., the area in which the spring ratchet arm touches the wire terminations. The spring ratchet arm then has a somewhat shovel-shaped contour. The shovel-shaped or circular contour has the advantage that the ratchet arm can spring away better when it is retracted and thus slides over the next wire termination or engages behind the next wire termination.

In order to improve the handling of the magazine, it is provided in another configuration that the feed mechanism can be moved from a starting position into a feed position. In the starting position, the ratchet arm of the feed mechanism rests on a wire termination. When the force that is applied by the feed mechanism is greater than the holding force that acts on the wire termination or on the wire termination strip, then the feed mechanism is moved into the feed position. Since in the starting position of the feed mechanism, the spring ratchet arm rests on a wire termination, the latter is also moved when the feed mechanism is brought from the starting position into the feed position.

When the feed mechanism is brought again into the starting position, the spring ratchet arm is also brought back into the starting position. Because of the elastic configuration, the spring ratchet arm can slide along on the wire termination, so that in the pre-loaded position, it rests again on a wire termination without moving the latter.

In order to prevent the friction between the spring locking hook and the wire terminations from becoming too great, in another configuration, another spring ratchet arm can be provided, which arm locks the movement of the wire terminations or the wire termination strip when the feed mechanism is brought into the starting position, wherein the movement in the feed position is released. Thus, the spring ratchet arm of the feed mechanism can be deflected when being brought into the starting position on the wire terminations and can engage behind on one of the wire terminations in the starting position without the wire terminations also being moved when being brought into the starting position, and the spring ratchet arm cannot be deflected past the wire terminations.

In a preferred configuration of the magazine, the release of the wire terminations can be done in that the feed mechanism and the cutting device are connected to one another in such a way that the feed mechanism is arranged in the feed position when the cutting device is placed in a neutral position, i.e., is not actuated. This means that the feed mechanism is brought into the feed position when the cutting device is no longer actuated. The cutting device can in this case be connected via a mechanical component, preferably a lever, to the feed mechanism. Articulated mounting of the lever can ensure that the feed mechanism is moved somewhat crosswise to the cutting device.

In another configuration of the invention, it is provided that the cutting direction of the cutting device runs crosswise to the orientation of the wire termination strip in the section of the separation. Thus, the cutting device can engage precisely in the intermediate space between two wire terminations, i.e., the connecting bridge, and sever the connecting bridge and then can be moved again in the opposite direction. In this way, the cutting device does not block the transport direction of the wire terminations or the wire termination strip.

An advantageous configuration of the invention calls for the cutting device to have a blade and for in each case a connecting bridge between two wire terminations to be severable by the cutting device. The blade can easily sever the connecting bridges. When the blade is sharp enough, a simple linear movement of the blade is sufficient to sever the connecting bridges. In a preferred embodiment, the blade can be designed to be slightly tapered, so that it first starts a hole at one point of the connecting bridge and, as the blade advances again, it severs the connecting bridge along a line. Thus, the linear movement of the blade is transferred crosswise to the transport direction of the wire termination strip in a cutting movement that is oriented crosswise to the movement of the blade.

For easier separation of the wire terminations, it is provided in another configuration of the invention that the cutting device comprises an element, preferably a wedge, by which the wire terminations can be detached from one another during the cutting process. The additional element can run conically, so that during or after the cutting process, the wire terminations are forced further apart when the conically running element are [sic] moved between the two wire terminations. In this case, the wedge can be arranged in such a way that the separated wire termination is tilted by the wedge inside the magazine.

In order to further improve the handling of the magazine, it is provided in another configuration of the magazine according to the invention that the cutting device can be brought from the neutral position into a cutting position and that the cutting device is held in the neutral position by an actuatable reset element. In order to trigger another cutting process, the reset element is deflected, so that the cutting device is moved from the neutral position into the cutting position. The reset element can be, for example, a spring. Because of the spring force of the reset element, the cutting device attempts to return to the neutral position. The reset element can be held in the cutting position by corresponding catching mechanisms such as locking hooks or the like. Preferably, the latter is moved into the cutting position by actuating a lever or a similar component and severs the connecting bridge between two wire terminations. If the reset element is released, the cutting device is conveyed again into the neutral position.

In order to facilitate a wire termination being brought from the magazine level into the depression level, it is provided in an advantageous configuration of the magazine according to the invention that a wire termination that is placed in the mounting position is arranged at a non-zero angle to the lengthwise extension of the wire terminations of the wire termination strip. The angle between the lengthwise extension of the wire termination of the wire termination strip and the lengthwise extension of the wire termination that is placed in the mounting position is preferably 20 degrees.

The separated wire termination can be forced away from the adjacent wire terminations by a holding element, for example a wedge, during the cutting process. As a result, on the one hand, the severing of the connecting bridge is supported, and, on the other hand, the wire termination is tilted. Because of the angle in the mounting position, the wire termination does not have to be positioned directly over a possible opening in the housing, through which a wire termination is conveyed into the depression level. A conductor or the stranded wires of a conductor are introduced into the wire termination in a line to the wire termination that is placed in the mounting position. A possible opening in the housing, through which a wire termination is brought into the depression level, need only also lie approximately on the line of the movement of the inserted conductor, so that the wire termination can be conveyed from the mounting position into the depression level.

According to a second teaching, the invention relates to a hand tool for crimping wire terminations with a stripped conductor end or with the stranded wires of a conductor with a magazine for wire terminations, in which the above set forth object is achieved. The hand tool according to the invention is initially and essentially characterized in that the magazine is configured according to the invention.

The embodiments relative to the magazine according to the invention accordingly also apply for the hand tool according to the invention with an attached magazine.

The above-mentioned handle of the hand tool can be configured as pliers. However, the handle can also be used only for actuating a drive mechanism. The hand tool can be operated, for example, electrically, pneumatically, or hydraulically. The feed mechanism and the cutting device of the magazine are coupled in these embodiments to the linear or rotary movement of the crimping of the wire terminations.

With the hand tool, it is possible to connect the wire termination positively to the conductor or to the stranded wires of a conductor. In this case, a joining process, crimping, is used. The wire termination is put with the inserted conductor into the depression level into the depression and squeezed together via the die stocks in such a way that the wire termination and the part of the conductor that is located in the wire termination undergo a plastic deformation. In order to increase the force that can be applied by the user, the hand tool can have an elbow lever, since during motion, the speed ratio continuously shifts between the applied force to the resulting force or from the primary stroke to the secondary stroke, and thus initially higher speeds of the die stocks can be achieved at lower force, and in the critical area, a low speed can be achieved with high force.

Because of the magazine that is connected to the hand tool, wire terminations into which a conductor is already plugged in the above-mentioned advantageous way can be fed to the depression of the hand tool. A wire termination that can be placed in the mounting position can thus receive a conductor.

For a comfortable operation of the magazine with the handle, it is provided in a configuration that the handle interacts with the magazine in such a way that the cutting device is actuated when the handle is placed in the first position. In the first position, the legs of the handle are at a greater angle to one another than in the second position, i.e., to bring the legs from the first position into the second position, the handle has to be squeezed together. The squeezing-together also produces a crimping of the wire terminations in the depression level, wherein the depression level coincides precisely with the depression of the hand tool. After crimping, the handle is again released, i.e., brought from the second position into the first position. When being brought from the second position into the first position, the cutting device is also simultaneously actuated, so that another wire termination is already separated when the hand tool is ready for the crimping of another wire termination.

In addition, it is provided in another configuration of the hand tool according to the invention that the handle interacts with the magazine in such a way that the feed mechanism is actuated when the handle is actuated. The feed mechanism thus transports the wire termination strip inside the magazine level when the handle is actuated. If a wire termination has already been separated by the cutting device, the next time the handle is actuated, the wire termination strip is transported by the feed mechanism to the extent that the next wire termination can be separated from the wire termination strip.

Bypass means are provided for easy operability. The bypass means interact with the pliers-like handle and the die stocks in such a way that by manually operating the handle, the crimping of at least one wire termination can be performed with a stripped conductor. In this way, the user can crimp the wire terminations with a conductor at lowest possible expense by only the handle being actuated manually.

In an advantageous configuration of the hand tool according to the invention, it is provided that the magazine is detachably connected to the hand tool, in particular by a latching connection. The mounting of the magazine on the hand tool can be done by, for example, a rotational movement, similar to a bayonet closure, or by plugging. The precise positioning of the magazine is done in this case via pins or other projections that are made on the magazine and engage in corresponding recesses. The pins or projections can also be made on the frame of the hand tool and the corresponding recesses on the magazine accordingly. The snapping-on can also be done, for example, by means of bent holding elements that engage behind the hand tool on the opposite side from where the magazine is attached. Because of the positioning of the magazine, the magazine thus does not slip, although it is a simple matter to fasten the magazine to the hand tool.

In order to enhance the quality of the crimping of the wire termination, in the case of an advantageous configuration of the hand tool according to the invention, more than two die stocks are provided, so that symmetrical crimping is done between the wire termination and the stripped conductor end or with the stranded wires of the conductor. The die stocks are then moved toward one another not only from two sides but are also moved toward one another from multiple directions in such a way that a symmetrical cross-section is produced between the die stocks, i.e., a symmetrical depression is produced. One advantage of using more than two die stocks consists in that the geometry of the depression remains the same or very similar for a large cross-sectional area. The die stocks close like a diaphragm, by which the geometry of the cross-section of the depression does not noticeably change during closing, since the die stocks are moved toward one another uniformly.

For this reason, it is provided in the case of an advantageous configuration of the invention that the die stocks are arranged in such a way that square crimping is done. In the case of an alternative configuration of the invention, it is provided that the die stocks are arranged in such a way that hexagonal crimping is done.

In particular, there are a number of options that configure and further develop the magazine according to the invention as well as the hand tool according to the invention. To this end, reference is made to the following detailed description of a preferred embodiment in connection with the accompanying drawings.

DETAILED DESCRIPTION OF THE INVENTION

Figure 1:
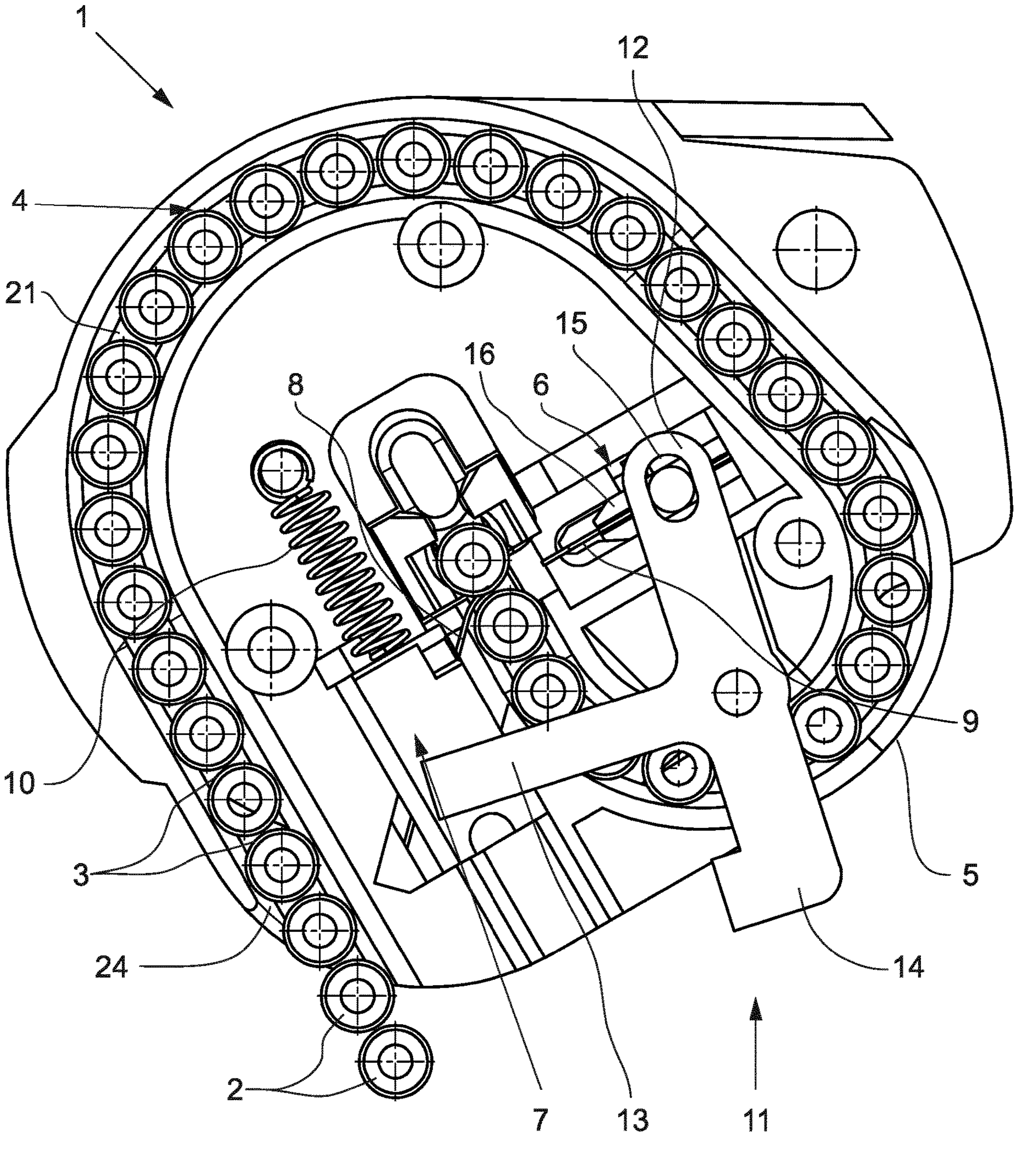
FIG. 1 is a top view of part of a magazine for processing wire terminations.

FIG. 1 shows a magazine 1 for processing wire terminations 2 that are connected via connecting bridges 3 to form a wire termination strip 4. The magazine has a housing 5, in which the wire terminations 2 are arranged. A cutting device 6 is provided for separating the wire terminations 2. A feed mechanism 7 is provided for the transport of wire terminations 2 or the wire termination strip 4 inside the magazine 1. The feed mechanism 7 comprises a spring ratchet arm 8, which is arranged between two wire terminations 2 in FIG. 1. A blade 9 is arranged on the cutting device 6 for separating the wire terminations 2. The feed mechanism 7 is connected to a reset element 10.

The cutting device 6 and the feed mechanism 7 are connected to one another via a setting lever 11 in such a way that a tilting of the setting lever 11 causes both the cutting device 6 and the feed mechanism 7 to move. The setting lever 11 is configured overall in the shape of a T, so that overall, three lever arms, a first lever arm 12, a second lever arm 13, and a third lever arm 14, are present. The first lever arm 12 is connected in an articulated manner to the cutting device 6 via a slot connection 15. The second lever arm 13 is connected in an articulated manner to the feed mechanism 7. The third lever arm 14 projects out from the housing 5, so that it can be actuated outside of the housing 5 and thus simultaneously actuates the cutting device 6 and the feed mechanism 7.

Figure 2:
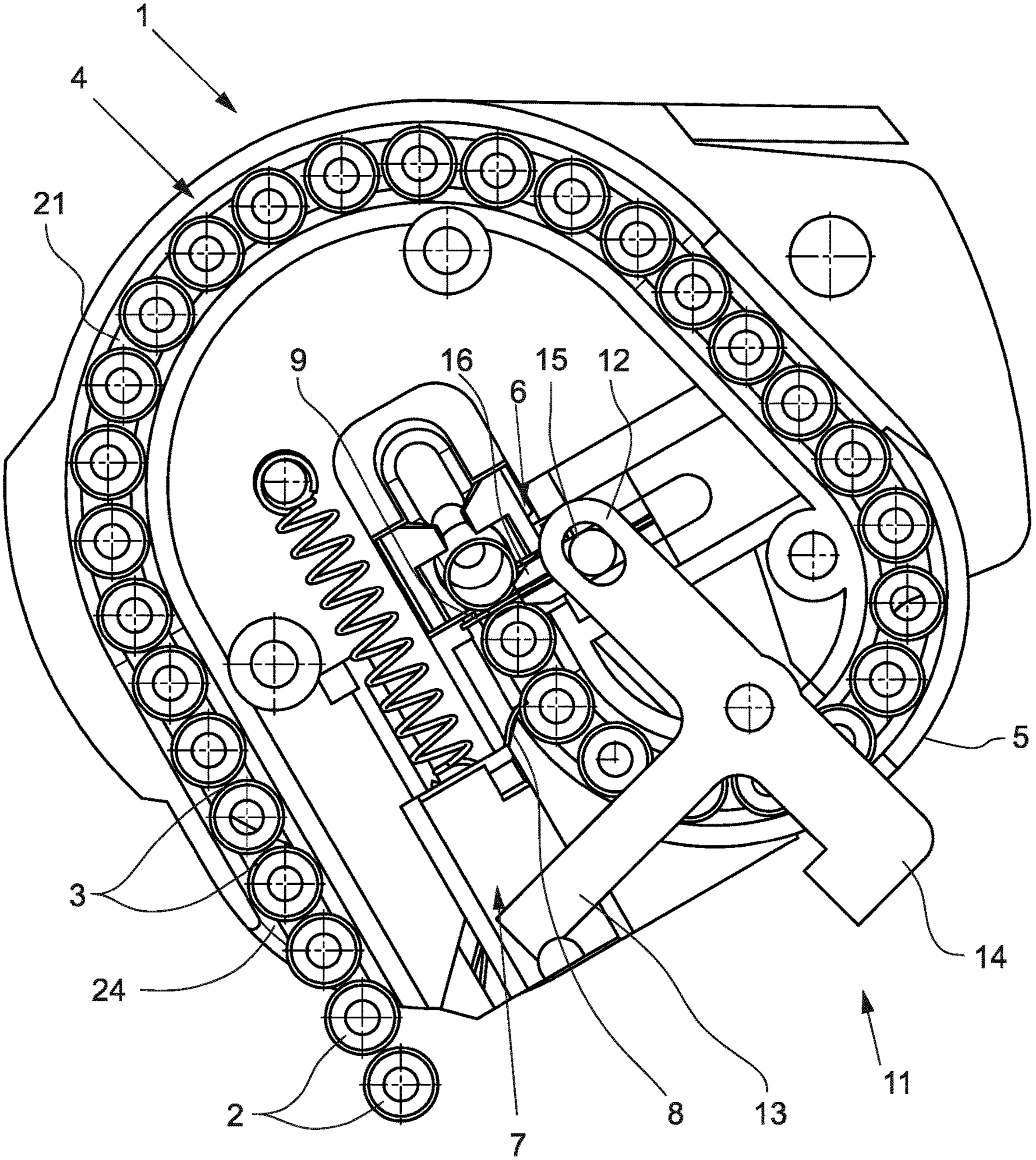
FIG. 2 shows a part of the magazine according to FIG. 1 during the separation of wire terminations.

FIG. 1 and FIG. 2 show the interaction of the cutting device 6 and the feed mechanism 7. In FIG. 1, the reset element 10 is released. The cutting device 6 is not actuated, i.e., the blade 9 is as far as possible from the wire terminations 2. If the cutting device 6 is not actuated, then the feed mechanism 7 is oriented in such a way that the spring ratchet arm 8 rests on the wire termination 2 that is to be separated, so that the wire termination strip 4 is brought into position for the separation.

In FIG. 2, the cutting device 6 is actuated, i.e., the blade 9 has severed the connecting bridge 3 between two wire terminations 2. The reset element 10 is deflected and used to move the cutting device 6 into the neutral position. The blade 9 is arranged in a wedge-shaped receptacle 16. The wedge-shaped receptacle 16 presses against the wire termination 2 that is to be separated, so that the latter is moved away from the wire termination strip 4. At the same time, the wedge-shaped receptacle 16 is arranged so that it tilts the separated wire termination 2 when being forced away. In this oblique mounting position, the wire termination 2 can then be transported from the magazine level into the depression level.

While the cutting device 6 is being actuated, the feed mechanism 7 is brought into its actual starting position. In the case of the movement from the feed position, i.e., the position in which the wire termination strip 4 is oriented for separation, the spring ratchet arm 9 is deflected into the starting position and slides on the closest wire termination 2 over its diameter until it can engage without deflection again in the intermediate space between two wire terminations 2. In the case of renewed actuation of the feed mechanism 7, the spring locking hook 9 then moves the wire termination strip 4 into the position in which the next wire termination 2 can be separated.

Figure 3:
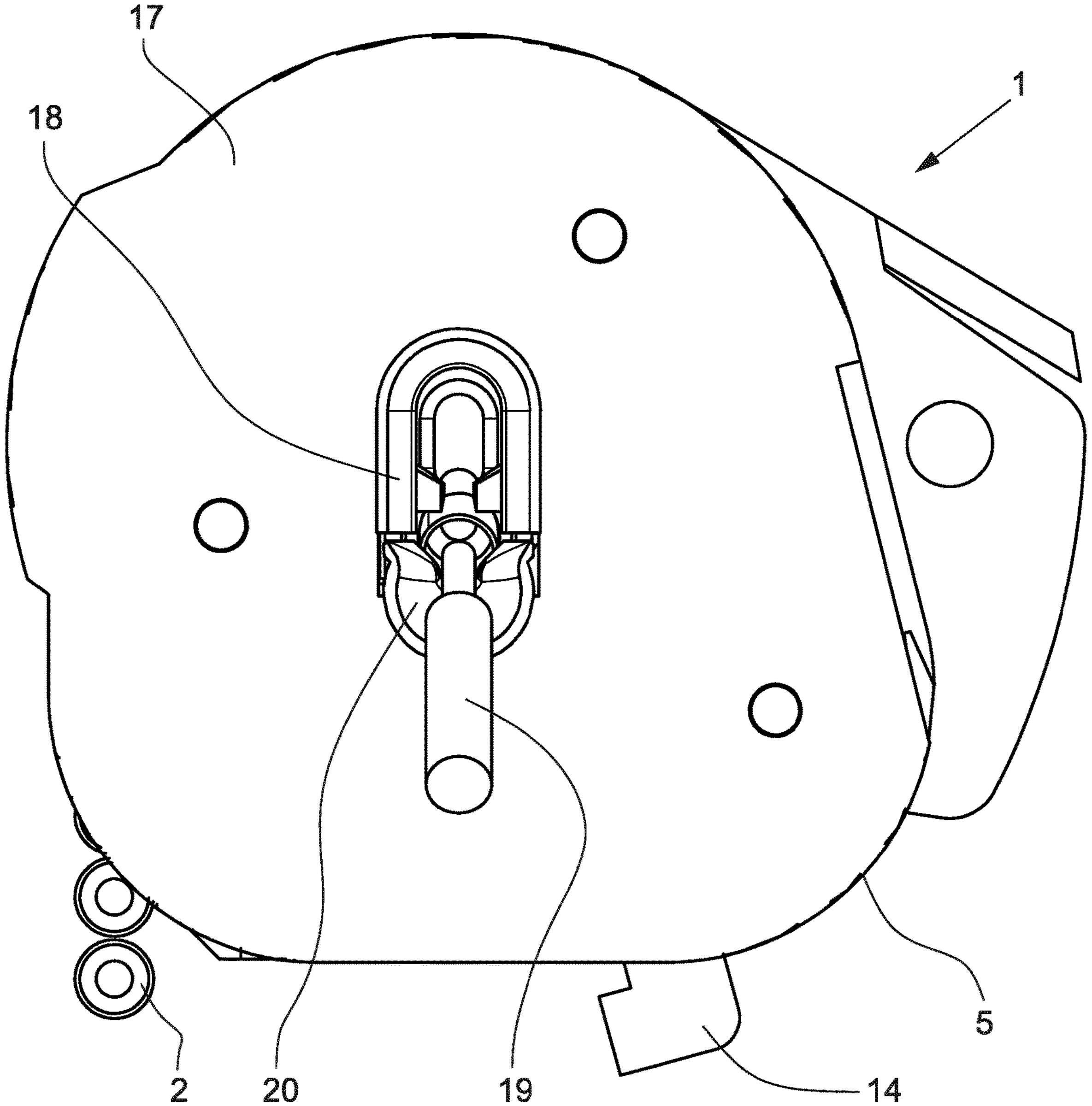
FIG. 3 shows the magazine according to FIG. 1 and FIG. 2 with a housing cover.

FIG. 3 shows the magazine according to FIG. 1 and FIG. 2 with a housing cover 17 and a conductor feed opening 18. A conductor 19 or the stranded wires of the conductor 19 can be inserted into the conductor feed opening 18. Since the separated wire termination 2 is oriented obliquely in the mounting position relative to the other wire terminations 2, the conductor 19 is also first inserted obliquely into the conductor feed opening 18. To this end, the conductor feed opening has a funnel-shaped section 20. The conductor 19 is correctly positioned by the funnel-shaped section 20, so that the stranded wires of the conductor 19 can be inserted correctly into the wire termination. By further insertion of the conductor 19, the wire termination 2 is conveyed along with the conductor 19 from the mounting position or from the magazine level into the depression level, in which the wire termination 2 can then be crimped. Then, the conductor 19 can be extracted again specifically from the conductor feed opening 18, while the next wire termination 2 is already positioned in the mounting position.

Figure 4:
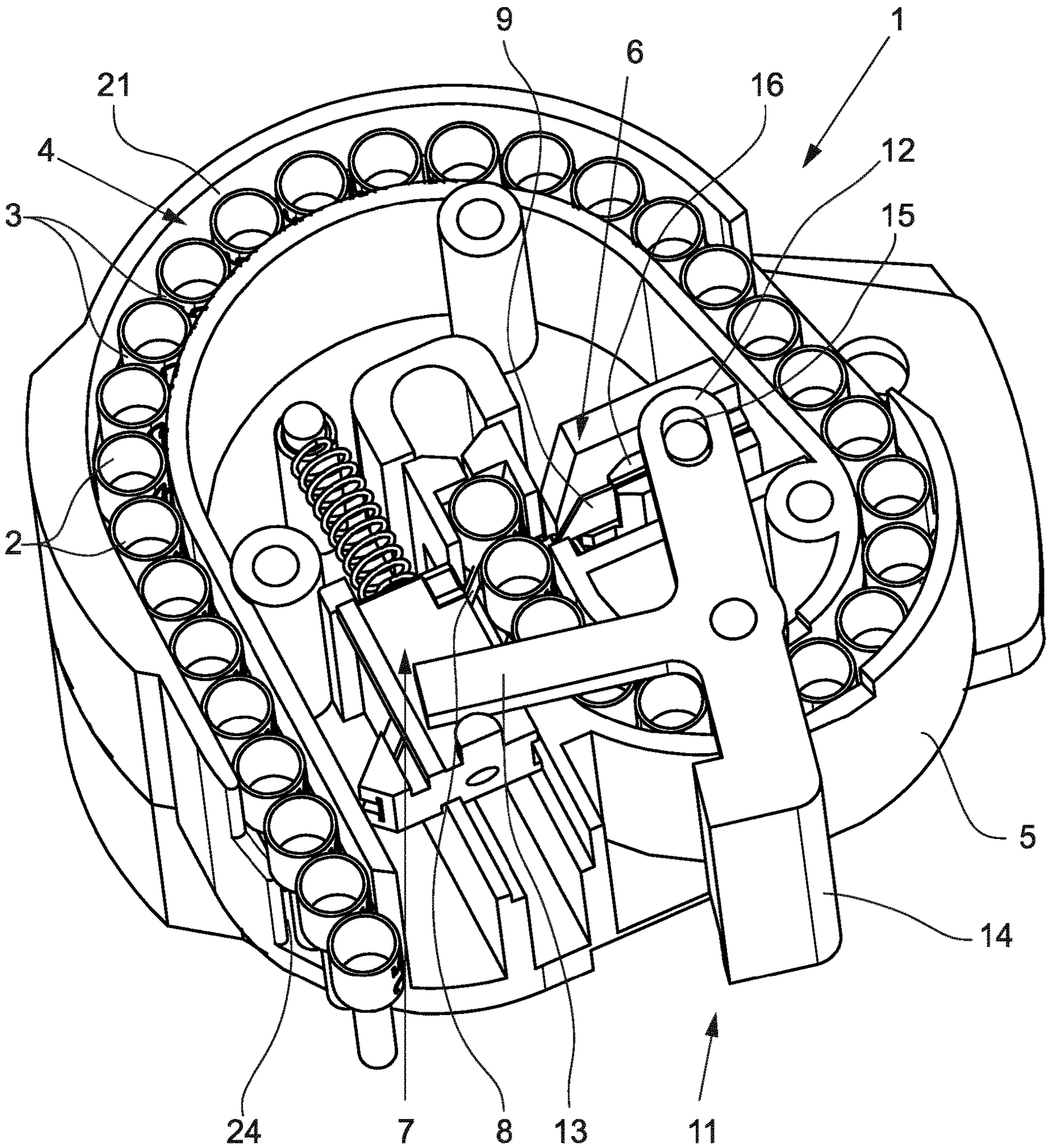
FIG. 4 is a perspective of part of a magazine according to FIG. 1.

FIG. 4 is a perspective of the magazine 1 according to FIGS. 1-3. It is evident that the third lever arm 14 of the setting lever 11 partially emerges from the housing 5. Thus, the setting lever 11 can also be actuated easily outside of the housing 5. The wire terminations 2 are guided inside the housing in a channel 21.

Figure 5:
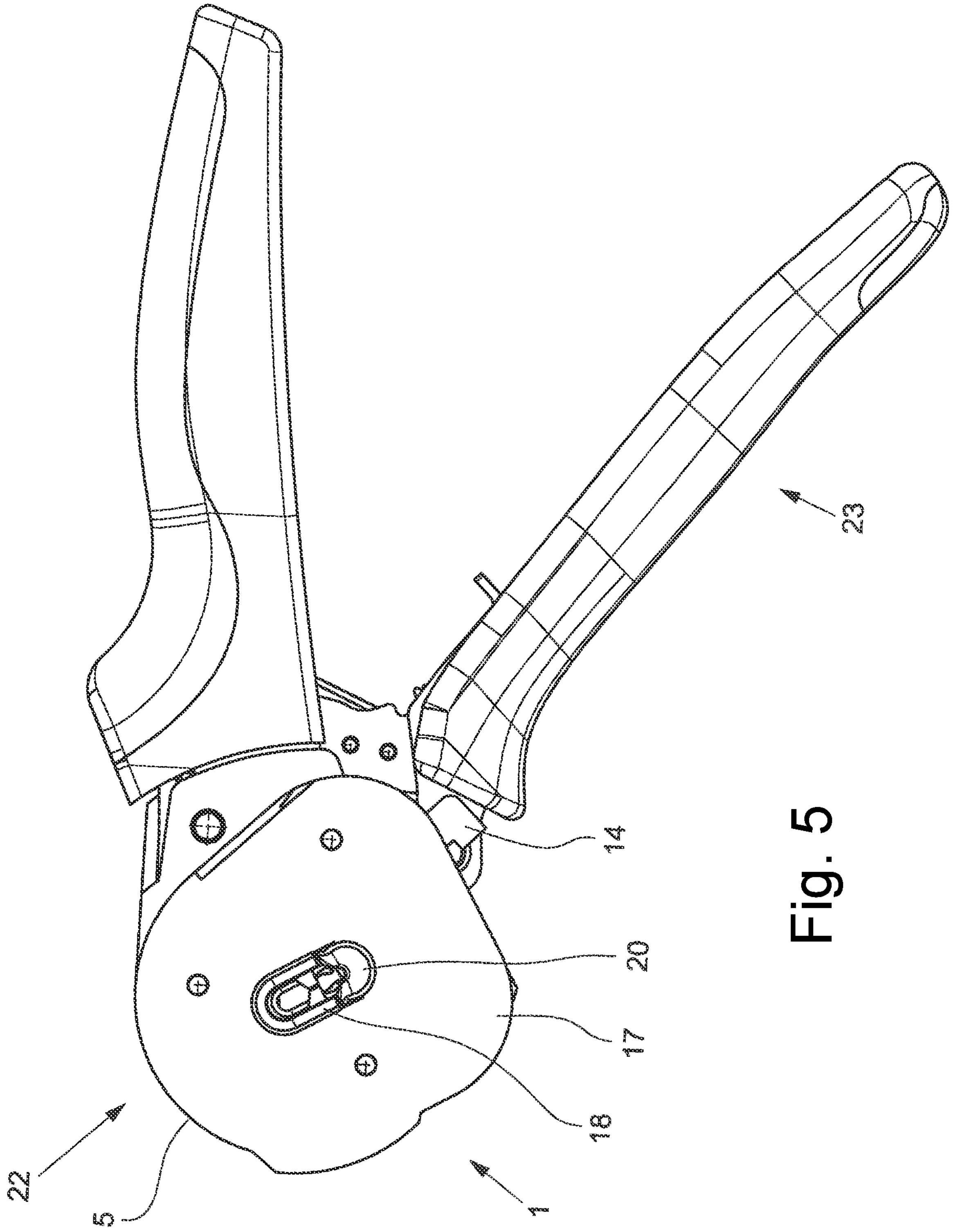
FIG. 5 shows a hand tool for processing wire terminations with a magazine with a handle in a first position.
Figure 6:
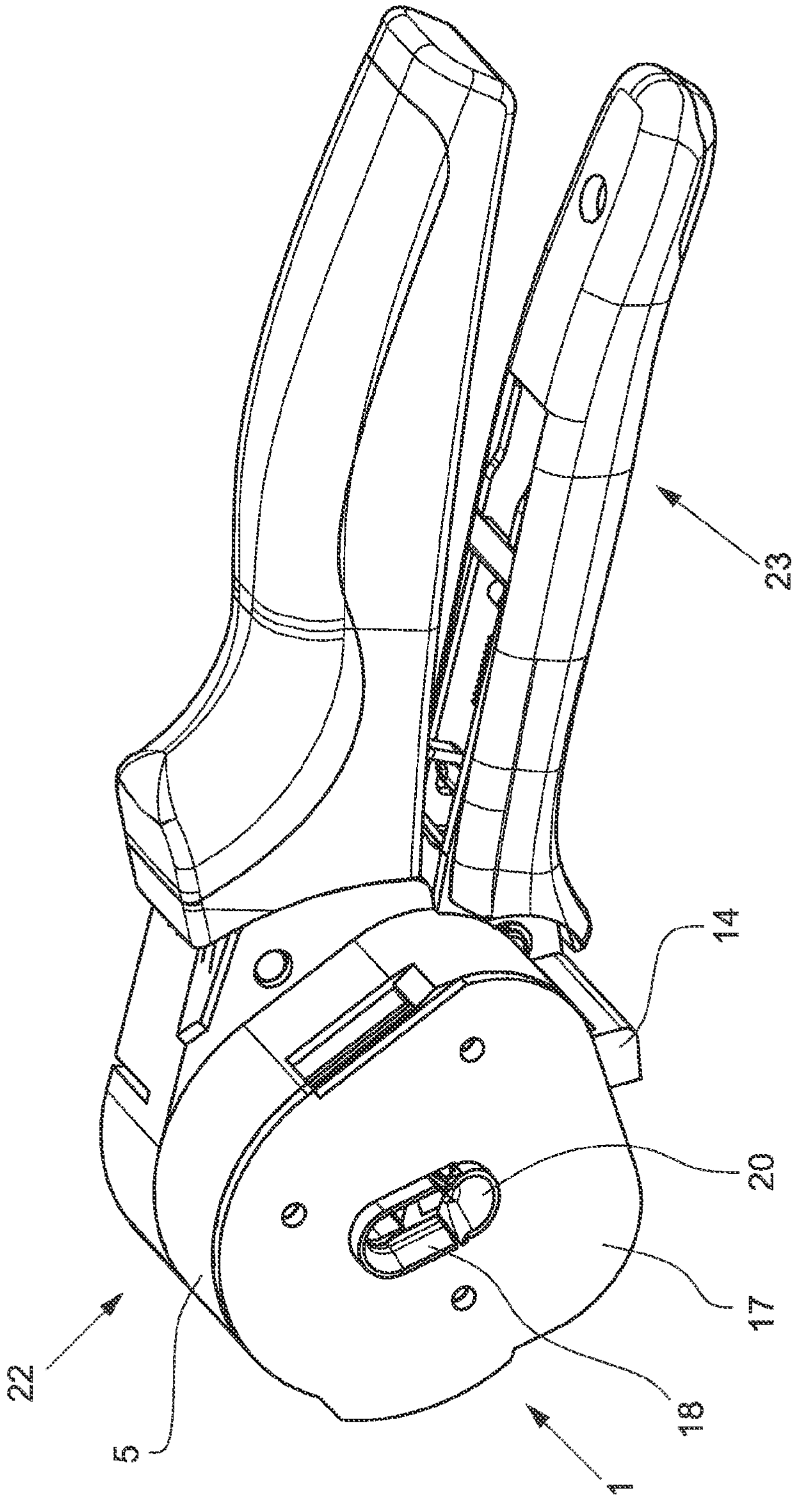
FIG. 6 shows the hand tool according to FIG. 5 with a handle in a second position.

FIGS. 5 & 6 show a hand tool 22 for crimping wire terminations 2 or more precisely for crimping wire terminations 2 with stripped conductor ends or with the stranded wires of a conductor 19. The hand tool 22 has a pliers-like handle 23, which is designed to move multiple die stocks toward one another, not shown. The die stocks form a depression, which coincides with the depression level and into which the wire termination 2 can be put and crimped. A magazine 1 for processing wire terminations 2 is fastened to the hand tool 22. In this case, the magazine 1 is arranged so that the conductor feed opening 18 of the magazine is positioned so that running a wire termination 2 with a plugged-in conductor into the depression is easily possible. The wire terminations 2 are introduced into the magazine 1 in continuous wire termination strips 4 and separated inside the magazine 1. Through the conductor feed opening 18, a conductor 19 can be plugged into a wire termination 2, which is placed in the mounting position. If the conductor 19 is inserted further into the conductor feed opening 18, the conductor 19 together with the wire termination 2 is routed into the depression of the hand tool 22 and ideally positioned. Using the hand tool 22, a crimping connection can then be produced between the conductor end and a wire termination 2. According to the crimping method, the conductor 19, together with the wire termination 2, is extracted from the magazine 1.

FIG. 5 shows the hand tool 22 with an unactuated handle 23, while FIG. 6 shows the hand tool with an actuated handle 23. The handle 23 is connected to the third lever arm 14, so that an actuation of the handle 23 also leads to an actuation of the third lever arm 14 and thus also to an actuation of the first lever arm 12 and the second lever arm 13 arranged in the housing 5 of the magazine 1. In this way, the separation and positioning of a wire termination 2 in the mounting position can be carried out automatically by actuating the handle 23.

Figure 7:
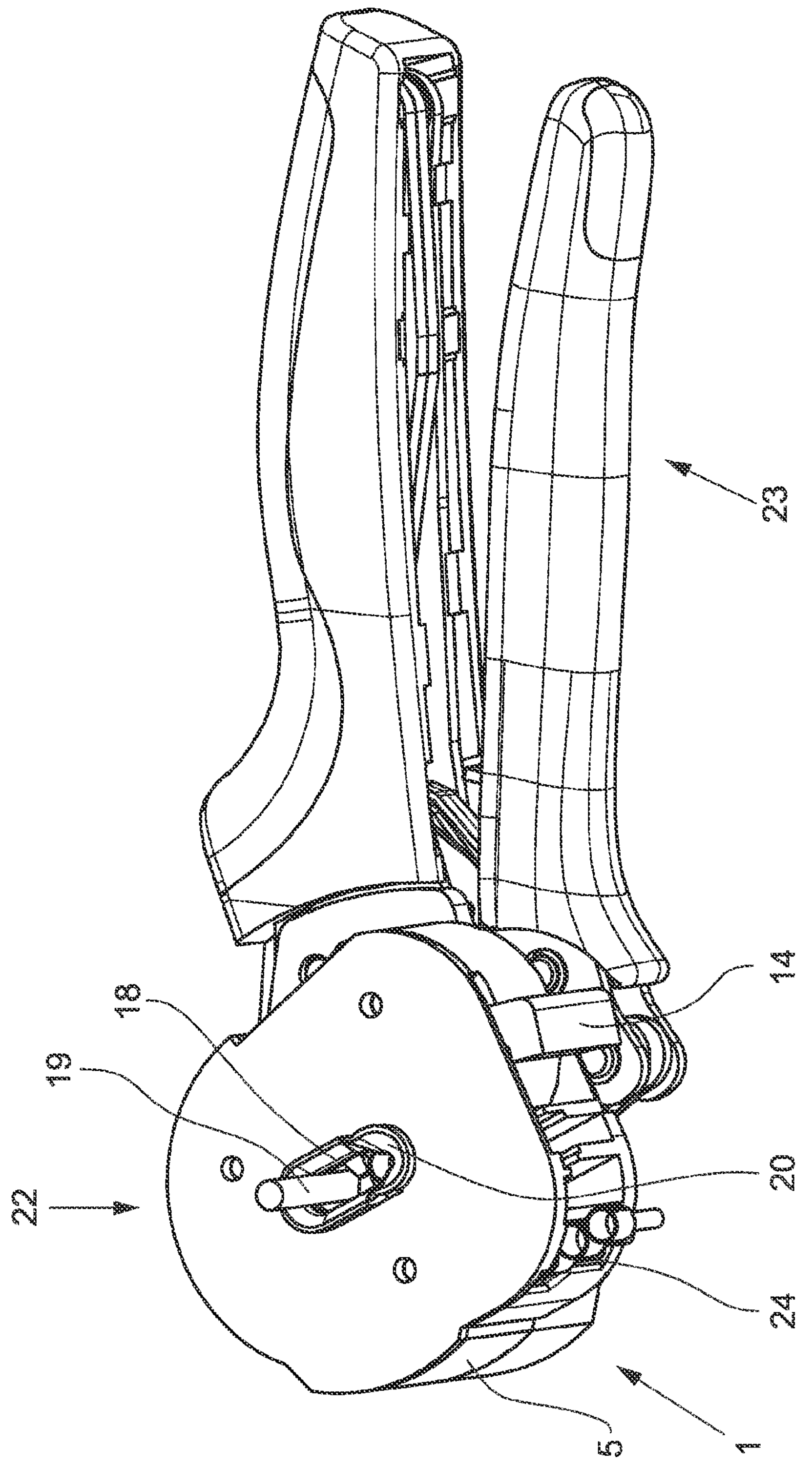
FIG. 7 shows the hand tool according to FIG. 5 and FIG. 6 with a conductor that is inserted into the magazine.

FIG. 7 shows the hand tool 22 according to FIG. 5 and FIG. 6 with a plugged-in conductor 19, which is crimped specifically with a wire termination 2. The wire termination strips 4 can be inserted into the magazine 1 via a feed opening 24 readily accessible from the outside. As soon as the wire termination strip 4 is brought into the area of the feed mechanism 7, the separation and positioning can be achieved by means of the handle 23.

The invention claimed is:

1. A magazine for processing wire terminations which are connected to one another via connecting bridges to form a wire termination strip, wherein the magazine comprises:

a housing having a magazine level in which the wire terminations can be separated from the wire termination strip, a cutting device in the magazine level, by which device the wire terminations can be separated from one another, and a feed mechanism in the magazine level, by which mechanism the wire termination strip can be transported in the magazine level, wherein the magazine is configured such that the separated wire terminations that were separated by the cutting device can be conveyed from a mounting position in the magazine level to a depression level for processing, and wherein the magazine level and the depression level are different from one another, such that a processing of a wire termination in the depression level is possible wherein at the same time the next wire termination is separated from the wire termination strip in the magazine level and is brought into the mounting position.

2. The magazine according to claim 1, wherein the separated wire terminations can be brought by the cutting device into the mounting position.

3. The magazine according to claim 1, wherein the feed mechanism comprises a spring ratchet arm which enables linear feeding of the wire terminations.

4. The magazine according to claim 1, wherein the feed mechanism is movable from a starting position into a feed position.

5. The magazine according to claim 4, wherein the feed mechanism and the cutting device are connected to one another in such a way that the feed mechanism is arranged in the feed position when the cutting device is in a neutral, unactuated position.

6. The magazine according to claim 1, wherein the cutting device has a cutting direction that runs crosswise to an orientation of the wire termination strip in a separating section of the magazine level.

7. The magazine according to claim 1, wherein the cutting device has a blade for severing a connecting bridge between each pair of wire terminations.

8. The magazine according to claim 1, wherein the cutting device comprises a wedge for moving a separated wire termination away from the wire termination strip.

9. The magazine according to claim 1, wherein the cutting device is movable from a neutral position into a cutting position and wherein an actuatable reset element is provided for holding the cutting device in the neutral position.

10. The magazine according to claim 1, wherein a separated wire termination in the mounting position is arranged at a non-zero angle relative to a lengthwise extension of the wire terminations of the wire termination strip.

11. A hand tool for crimping wire terminations with a stripped conductor end, comprising:

a handle which is movable from a first position into a second position, at least two die stocks that can be brought together by actuating the handle and which form a depression in a depression level of the hand tool in which a wire termination can be positioned, and a magazine in which the wire terminations are stored, wherein the wire terminations can be fed from the magazine to the depression, wherein the magazine has a magazine level in which the wire terminations can be separated from a wire termination strip by a cutting device, the separated wire terminations can be conveyed from a mounting position in the magazine level to the depression level for processing, and the magazine level and the depression level being different from one another, such that a processing of a wire termination in the depression level is possible wherein at the same time the next wire termination is separated from the wire termination strip in the magazine level and is brought into the mounting position.

12. The hand tool according to claim 11, further comprising a cutting device, wherein the handle interacts with the magazine in such a way that the cutting device is actuated when the handle is placed in the first position.

13. The hand tool according to claim 11, wherein the handle interacts with the magazine in such a way that a feed mechanism for the wire termination strip is actuated when the handle is actuated.

14. The hand tool according to claim 11, wherein the handle is a pliers-shaped handle and wherein bypass means are provided which interact with the pliers-shaped handle and the die stocks in such a way that, by manually operating the handle, crimping of at least one stripped conductor wire termination can be performed.

15. The hand tool according to claim 11, wherein said at least two die stocks comprise more than two die stocks so that symmetrical crimping is performable between the wire termination and the stripped conductor end or with stranded wires of a conductor.

16. The hand tool according to claim 11, wherein the separated wire terminations can be brought by the cutting device into the mounting position.

17. The hand tool according to claim 11, wherein a feed mechanism comprises a spring ratchet arm which enables linear feeding of the wire terminations.

18. The hand tool according to claim 11, further comprising a cutting device, wherein a feed mechanism is movable from a starting position into a feed position, and wherein the feed mechanism and the cutting device are connected to one another in such a way that the feed mechanism is arranged in the feed position when the cutting device is in a neutral, unactuated position.

19. The hand tool according to claim 11, further comprising a cutting device, wherein the cutting device is movable from a neutral position into a cutting position and wherein an actuatable reset element is provided for holding the cutting device in the neutral position.

20. The hand tool according to claim 11, wherein a separated wire termination in the mounting position is arranged at a non-zero angle relative to a lengthwise extension of the wire terminations of the wire termination strip.

* * * * *